Oct. 6, 1959     Z. V. WEISEL     2,907,220
CONICAL ROLLER TRANSMISSION

Filed May 28, 1956     2 Sheets-Sheet 1

INVENTOR.
ZENAS V. WEISEL
BY
ATTORNEYS

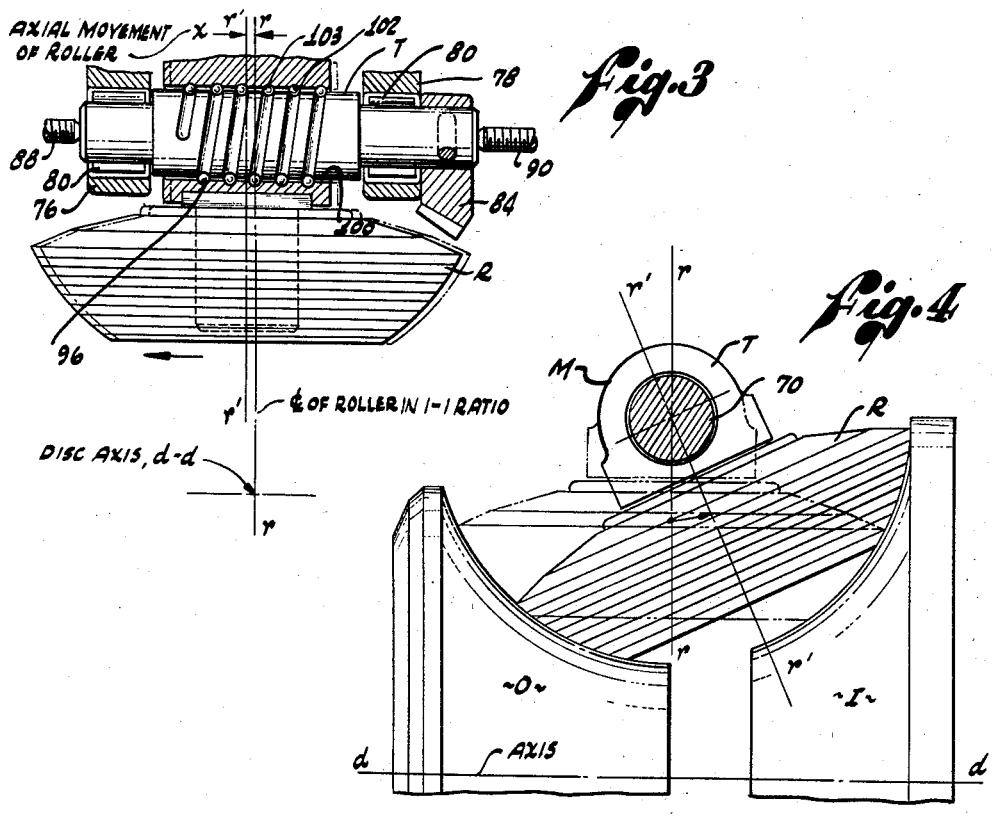

United States Patent Office 2,907,220
Patented Oct. 6, 1959

2,907,220

CONICAL ROLLER TRANSMISSION

Zenas V. Weisel, Los Angeles, Calif.

Application May 28, 1956, Serial No. 587,826

9 Claims. (Cl. 74—200)

The present invention relates generally to transmissions and more particularly to a novel and improved conical roller transmission.

In my co-pending patent application Serial No. 363,606, filed June 23, 1953, now Patent No. 2,748,614, issued June 5, 1956, there is disclosed a conical roller transmission incorporating a pair of coaxial driving and driven discs which are bridged by a plurality of conically profiled rollers. The rollers are each supported by mounting means that include a universal mounting for the roller and a tiltable member connecting the universal mounting to the transmission's frame. The transmission is so designed that during rotation of the discs the rollers normally tend to assume a position wherein the axis of rotation of each roller intersects the axis of rotation of the discs. When it is desired to vary the relative speed of the discs, the angularity of the rollers relative to the discs is changed. This change in angularity is accomplished by tilting each of the rollers until its axis of rotation no longer intersects the axis of rotation of the discs. The rollers will then automatically move bodily to their new ratio position wherein their axes of rotation again intersect the axis of rotation of the discs. This arrangement permits the surface of the rollers in contact with the surfaces of the discs to undergo substantially skid-free rolling movement in a spiral path along the latter surfaces as the rollers move from one ratio position to another. As pointed out in my co-pending patent application unless the rollers can undergo such skid-free rolling movement, they must be forcibly skidded between ratio positions. Such skidding of the rollers over the discs gives rises to three major disadvantages. (a) It necessitates a comparatively low power capacity so as to avoid complete loss of traction during a change in ratio as the rollers are skidded from one position to another, (b) it requires a very heavy control force to urge the rollers to skid between ratio positions, and (c) the rate at which the ratio positions undergo change must be comparatively slow so as to avoid damage to the traction surfaces of the rollers and the disc members.

It is a major object of the present invention to provide a conical roller transmission generally similar to that covered by my above-identified application but incorporating a different roller mounting structure. The structure of the present invention permits the rollers to undergo substantially skid-free rolling movement between ratio positions and generally affords the same advantages as that disclosed in my above-mentioned prior application.

Another object of the present invention is to provide a conical roller transmission which is extremely efficient at all speeds and under all load conditions.

An additional object of the invention is to provide a conical roller transmission which is capable of transmitting a maximum amount of power for a minimum weight and size.

It is another object to provide a conical roller transmission wherein tracking of the rollers on the discs is relatively insensitive to deflections, differential expansion, tolerance variations in machining and to variations in power load.

Yet an additional object of the invention is to provide a conical roller transmission which is compact and yet capable of transmitting a heavy load over an extended period of time without requiring attention.

A further object is to provide a conical roller transmission using wide-faced rollers which require a minimum roller-to-disc loading force relative to the traction force.

It is yet another object of the present invention to provide a conical roller transmission which requires a minimum amount of control force in order to shift the rollers from one ratio position to another.

Another object is to provide a conical roller transmission which is simple in design and rugged of construction whereby it may afford a long and trouble-free service life.

These and other objects and advantages of the present invention will become apparent from the following detailed description, when taken in conjunction with the appended drawings, wherein:

Figure 3 is a front view showing the movement followed by a roller as its ratio position is changed; and Figure 4 is a side view showing such roller movement.

Figure 1:
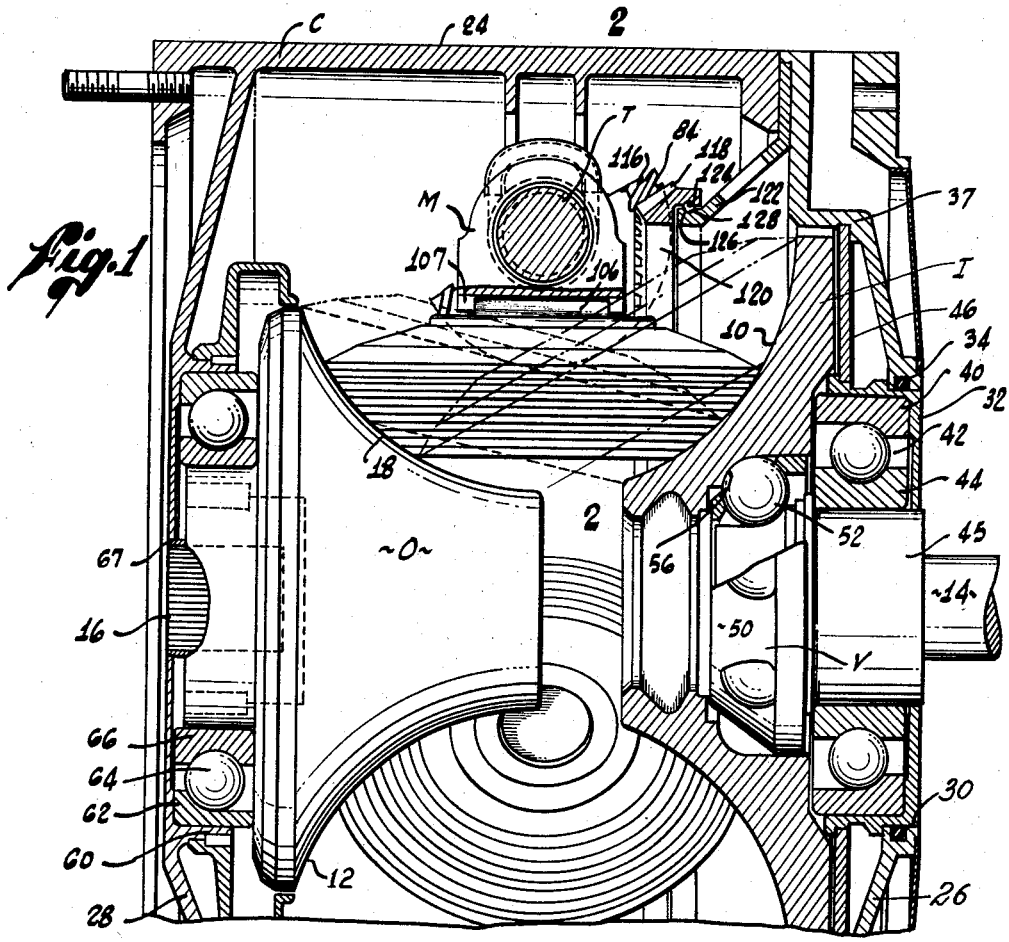
Figure 1 is a longitudinal vertical sectional view of a preferred form of conical roller transmission embodying the present invention.

Referring to the drawings, the preferred form of conical roller transmission embodying the present invention broadly comprises a frame or casing C which independently rotatably supports a driving or input disc I and a driven or output disc O. These discs are formed with spaced-apart opposed concave surfaces of revolution approximating a toric section and designated 10 and 12, respectively. The driving disc I is connected to a drive shaft 14 by a torque responsive thrust varying means V, while the driven disc O carries a splined sleeve 16 for receiving an output shaft (not shown). A plurality of conically profiled rollers R are interposed between the disc members I and O. Each of these rollers R is formed with a convex surface 18, bridging the concave surfaces 10 and 12 of the input and output discs I and O. The rollers R are each supported by a roller-carrying member M. A trunnion T is interposed between each roller-carrying member M and the frame C. Rotation of the driving disc I is transferred to the driven disc O by means of the rollers R, the driven disc O rotating in the opposite direction from the driving disc I. Variation of the relative speeds of hte two discs is accomplished by effecting a change in the angularity of the rollers R relative to the discs, as indicated by the dotted showing of the rollers in Figure 1.

More particularly, the casing C is of annular transverse cross-section having an outer wall 24, a removable front wall 26 and an integral rear wall 28. The front wall 26 is formed with a coaxial opening 30 wherein is disposed a retainer cup 32. A seal ring 34 is interposed between the front wall and the front portion of this retainer cup. The retainer cup 32 encompasses the outer element 40 of a ball bearing assembly 42. The inner element 44 of the latter assembly encompasses a boss 45 formed on the drive shaft 14. A flexible, dished-disc type pre-load spring 46 is interposed between the rear portion of the retainer cup 32 and a shoulder 37 formed in the front wall 26. This pre-load spring 46 constantly exerts a rearwardly acting force upon the retainer cup 32 for a purpose to be described hereinafter.

The torque responsive thrust varying means V may be similar to one of the forms disclosed in my above-described co-pending application Serial No. 363,606. It should be particularly observed, however, that other types of torque responsive thrust varying means may be employed without departing from the scope of the present invention. The particular type of torque responsive thrust varying means disclosed herein is of the angular contact cam type and includes a retainer 50 for a plurality of balls 52. As shown in Figure 1, the inner raceway 54 for these balls 52 is formed of the rear end of the drive shaft 14. The outer raceway 56 is formed at the front portion of the driving disc I. This outer raceway 56 includes a plurality of pockets defining cam surfaces which are inclined axially relative to the axis of rotation of the two discs. The mode of operation of the torque responsive thrust varying means V will be fully set forth hereinafter.

The rear wall 28 is formed with an inwardly directed annular flange 60 that encompasses the outer element 62 of the rear ball bearing assembly 64. The inner element 66 of the rear ball bearing assembly encompasses the output sleeve 16. The rear wall 28 is coaxially formed with an annular opening 67 for receiving the output sleeve 16.

Figure 2:
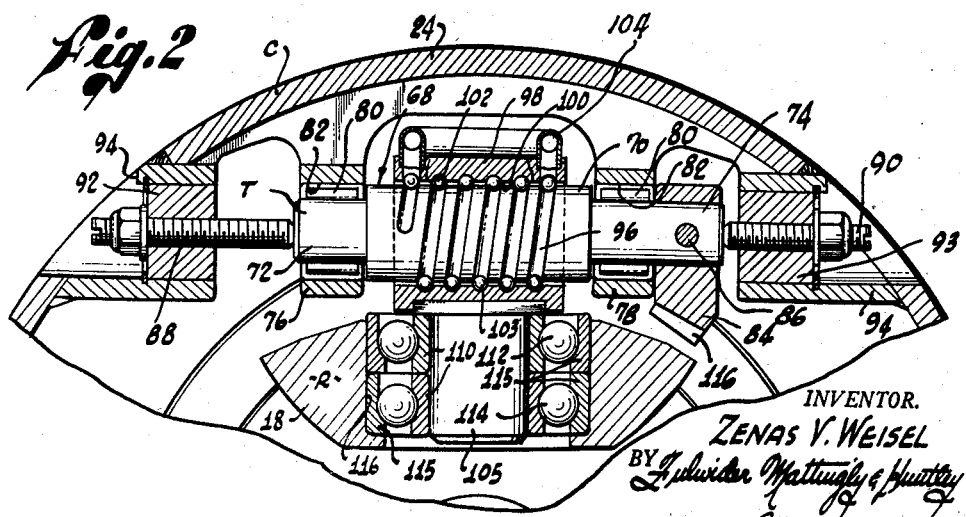
Figure 2 is a vertical sectional view taken on line 2—2 of Figure 1.

Each of the trunnion members T includes a screw element 68 having a cylindrical body 70 from each end of which extends a stub shaft, the latter being designated 72 and 74. As shown in Figure 2, the stub shafts 72 and 74 are journaled within a pair of ears 76 and 78 constituting integral inward extensions of the outer wall 24 of the casing C. Roller bearings 80 are interposed between the stub shafts and aligned bores 82 formed through the ears 76 and 78. With particular reference to Figure 2, the right-hand stub shaft 74 is longer than the left-hand stub shaft 72 and is keyed to a hypoid gear 84 by means of a pin 86. The screw element 68 may be centered relative to the casing C and the discs I and O by a pair of set screws 88 and 90 which are carried by opposed plugs 92 and 93, respectively, that are removably affixed to the casing C by snap rings 94. The body 70 of the screw element 68 is formed with a spiral groove 96 defining a screw thread.

The roller-carrying members M each include a nut element 98 formed with a coaxial bore 100 that receives the cylindrical body of a screw element 68 of a trunnion member T. Each bore 100 is formed with a spiral groove 102 which is complementary to the spiral groove 96 formed in the body of the screw element 68. A plurality of balls 103 are disposed within the grooves 96 and 102. The outermost grooves of the nut element 98 are interconnected by a ball return tube 104. The radially inner portion of the nut element 98 slidably supports a radially extending shaft 105 for movement in a plane parallel to the axis of rotation of the discs I and O. Thus, the radially outer end of the shaft 105 is formed with a square boss 106 that is slidably disposed within a slideway 107 formed in the radially inner portion of the nut element 98. With this arrangement, the rollers R are permitted to undergo a slight amount of axial movement relative to the casing C so as to follow the axial shifting of the driven disc O under varying load conditions. The shaft 105 receives the inner elements 110 of a pair of axial thrust type ball bearing assemblies 112 and 114. The outer elements 115 of these bearing assemblies are fitted within a coaxial cavity 116 formed in one of the rollers R. With this arrangement, the radially outwardly directed forces to which the rollers R are subjected are transferred to the casing C through the nut elements 98, screw elements 68 and the ears 76 and 78.

Referring again to Figure 1, each hypoid gear 84 is formed with teeth 117 that are engaged with complementary teeth 118 formed in the outer periphery of a control ring 120. The control ring 120 is coaxially rotatably supported within the casing C by a support ring 122 having its outer portion rigidly affixed to the casing. The adjoining surfaces of the control and support rings are formed with complementary semi-circular grooves 124 and 126 wherein are disposed a plurality of ball elements 128. The control ring 120 is adapted to undergo limited rotation in either direction under the influence of a manually or automatically operated control system (not shown).

In the operation of the aforedescribed transmission, the preload spring 46 constantly biases the front ball bearing assembly 42 and the drive shaft 14 rearwardly towards the driven disc O so as to obtain preloading of rollers against the discs and of the torque responsive thrust varying means V. Upon the application of torque upon the drive shaft 14 above that which through cam action will equal the thrust load of the preload spring 46 resisted by an approximately equal torque of the output disc O, the balls 52 will tend to cam the driving disc I rearwardly, or to the left in Figure 1, so as to increase the pressure of the driving disc I against the rollers R and of the latter against the driven disc O. The greater the torque the larger the force effected by the torque responsive means V tending to create a thrust urging the driving disc I rearwardly. With this arrangement, the contact pressure of the rollers R against the concave surfaces 10 and 12 of the discs I and O will be automatically regulated.

When it is desired to change the relative speeds of the driving and driven discs I and O the control ring 120 will be rotated through a limited number of degrees in the direction necessary to effect such change. Referring now to Figure 3, such rotation of the control ring 120 will effect concurrent rotation of each of the hypoid gears 84 and hence of the screw elements 68. Rotation of the screw elements 68 serves to effect concurrent movement of each of the nut elements 98 along the longitudinal axis of each screw element. In this manner, each of the rollers R will be caused to move along a straight path normal to a plane containing the axis of rotation of the discs and parallel to the axis of rotation of the rollers. This roller movement is shown in Figure 3, the roller R being normally disposed in its dotted outline position of this figure and being caused to undergo axial movement to its solid outline position therein upon rotation of the screw element 68.

As indicated in Figure 3, the axis of rotation $r—r$ of each roller R normally intersects the axis of rotation $d—d$ of the discs I and O. Rotation of the control ring 120, however, will cause this roller to be moved to the left in the manner described immediately hereinabove until its axis of rotation $r—r$ is displaced to one side of the axis of rotation $d—d$ of the discs as indicated by reference numerals $r'—r'$. It will be observed that the axis of rotation of the rollers, however, remains in a plane parallel to the axis of rotation of the discs both during and after such movement of the roller, which plane is gradually displaced from the axis of rotation of the discs to a point to one side thereof during such roller movement. When the roller has been moved to its solid outline position of Figure 3 in preparation for a change to a new ratio position, it will be in a state of unbalance relative to the discs, inasmuch as each of the rollers normally tend to assume a position in which its axis of rotation intersects that of the discs so long as the discs are undergoing rotation.

In order for the system to again reach a state of balance, the roller R, and hence the nut element 98, will swing bodily about the longitudinal axis of the screw element 68 from the dotted outline position of Figure 4 to the solid outline position therein. Such swinging motion causes the nut element 98 to screw itself to the right relative to Figure 3 until the axis of rotation $r—r$ of the roller R again intersects the axis of rotation $d—d$ of the discs I and O. The roller R will thus automatically be moved to its new ratio position. Moreover, during such movement the convex surface 18 of the roller R in contact with the concave surfaces 10 and 12 of the rotating discs will undergo substantially skid-free rolling movement in a spiral path along the latter surfaces. When the rollers R reach their new ratio position, the system will again be in a state of balance and little if any force must be applied through the control system in order to maintain the rollers in such new position.

While there has been shown and described hereinbefore what is considered to be the preferred embodiment of the present invention, various changes and modifications may be made with respect thereto without departing from the spirit of the invention or the scope of the following claims.

I claim:

1. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member carried by said frame and having a screw element extending along a longitudinal axis substantially normal to the axis of rotation of said discs and spaced radially outwardly therefrom; a roller-carrying member rotatably supporting said roller with the axis of rotation of said roller being normal to the longitudinal axis of said trunnion member and the axis of rotation of said roller normally intersecting the axis of rotation of said disc members, said roller-carrying member having a nut element engaged with said screw element whereby said roller-carrying member is movable relative to said trunnion member along the longitudinal axis thereof upon rotation of said screw element; and control means for rotating said screw element so as to effect movement of said roller-carrying member relative to said trunnion member along the longitudinal axis thereof until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

2. A conical roller transmission, comprising: a frame; a pair of relatively axially shiftable, independently rotatable, coaxial driving and driven discs formed with spaced-apart opposed concave surfaces of revolution approximating a toric section; a conically profiled roller interposed between said discs and formed with a convex surface bridging the concave surfaces thereof; a trunnion member carried by said frame and having a screw element extending along a longitudinal axis substantially normal to the axis of rotation of said discs and spaced radially outwardly therefrom; a roller-carrying member having a shaft rotatably supporting said roller with the axis of rotation of said roller being normal to the longitudinal axis of said trunnion member and the axis of rotation of said roller normally intersecting the axis of rotation of said disc members, said roller-carrying member having a nut element engaged with said screw element whereby said roller-carrying member is movable relative to said trunnion member along the longitudinal axis thereof upon rotation of said screw element, and said shaft being movable relative to said frame parallel to the axis of rotation of said discs in order that said roller may follow relative axial shifting of said discs; and control means for rotating said screw element so as to effect movement of said roller-carrying member relative to said trunnion member along the longitudinal axis thereof until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

3. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a roller-carrying member rotatably supporting said roller with the axis of rotation thereof located in a plane parallel to the axis of rotation of said discs and the axis of rotation of said roller normally intersecting the axis of rotation of said discs; screw and nut means interposed between said frame and said roller-carrying member for effecting bodily movement of said roller-carrying member along an axis substantially normal to the axis of rotation of said discs and spaced outwardly therefrom until the axis of rotation of said roller no longer intersects the axis of rotation of said discs in preparation for change to a new ratio position wherein said axes will again intersect, said roller-carrying member automatically swinging relative to said frame in a plane parallel to the axis of rotation of said discs and said roller automatically moving bodily to said new ratio position with its surface in contact with the surfaces of said discs undergoing substantially skid-free rolling movement in a spiral path along the latter surfaces as said discs are rotated; a control ring supported by said frame for limited rotation in either direction; and gearing interposed between said screw and nut means and said control ring whereby rotation of said control ring will effect concurrent rotation of said screw means as said discs are rotated.

4. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member carried by said frame and having a screw element extending along a longitudinal axis substantially normal to the axis of rotation of said discs and spaced outwardly therefrom; a roller-carrying member rotatably supporting said roller with the axis of rotation of said roller being normal to the longitudinal axis of said trunnion member and the axis of rotation of said roller normally intersecting the axis of rotation of said disc members, said roller-carrying member having a nut element engaged with said screw element whereby said roller-carrying member is movable relative to said trunnion member along the longitudinal axis thereof upon rotation of said screw element; a control ring rotatably supported by said frame; and gearing interposed between said screw element and said ring whereby rotation of said control ring will effect concurrent rotation of said screw means so as to effect movement of said roller-carrying member relative to said trunnion member along the longitudinal axis thereof until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

5. A conical roller transmission, comprising: a frame; a pair of relatively axially shiftable, independently rotatable, coaxial driving and driven discs formed with spaced-apart opposed concave surfaces of revolution approximating a toric section; a conically profiled roller interposed between said discs and formed with a convex surface bridging the concave surfaces thereof; a trunnion member carried by said frame and having a screw element extending along a longitudinal axis substantially normal to the axis of rotation of said discs and spaced outwardly therefrom; a roller-carrying member having a shaft rotatably supporting said roller with the axis of rotation of said roller being normal to the longitudinal axis of said trunnion member and the axis of rotation of said roller normally intersecting the axis of rotation of said disc members, said roller-carrying member having a nut element engaged with said screw element whereby said roller-carrying member is movable relative to said trunnion member along the longitudinal axis thereof upon rotation of said screw element, and said shaft being movable relative to said frame parallel to the axis of rotation of said discs in order that said roller may follow relative axial shifting of said discs; a control ring rotatably supported by said frame; and gearing interposed between said screw element and said ring whereby rotation of said control ring will effect concurrent rotation of said screw means so as to effect movement of said roller-carrying member relative to said trunnion member along the longitudinal axis thereof until the axis of rotation of said roller no longer intersects the axis of rotation of said discs in preparation for a change to a new ratio position wherein said axis will again intersect, said roller automatically moving bodily to said new ratio position with its surface in contact with the surfaces of said discs undergoing substantially skid-free rolling movement in a spiral path along the latter surfaces as said discs are rotated.

6. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member carried by said frame and having a screw element, the longitudinal axis of said screw element being substantially normal to the axis of rotation of said discs and spaced radially outwardly therefrom; a roller-carrying member having a nut element encompassing said screw element, said nut element being formed with a radially extending shaft normal to the longitudinal axis of said screw element which supports said roller, the axis of rotation of said roller normally intersecting the axis of rotation of said disc members; complementary grooves formed in the confronting surfaces of said screw and nut elements and defining a screw thread; ball elements disposed within said grooves; and control means connected to said trunnion member for rotating said screw element so as to effect movement of said nut element relative thereto along the longitudinal axis thereof until the axis of rotation of said roller no longer intersects the axis of rotation of said discs in preparation for a change to a new ratio position wherein said axes will again intersect, said roller automatically moving bodily to said new ratio position with its surface in contact with the surfaces of said disc undergoing substantially skid-free rolling movement in a spiral path along the latter surfaces as said discs are rotated.

7. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member having a screw element which includes a cylindrical body from both ends of which extends a stub shaft, the longitudinal axis of said cylindrical body being substantially normal to the axis of rotation of said discs and spaced outwardly therefrom; means formed on said frame journalling said stub shaft; a roller-carrying member having a nut element encompassing said screw element, said nut element being formed with a radially extending shaft normal to the longitudinal axis of said cylindrical body for supporting said roller, the axis of rotation of said roller normally intersecting the axis of rotation of said disc members; a gear keyed to one of said stub shafts; and a control ring rotatably journaled by said frame and engaging said gear whereby rotation of said control ring will effect concurrent movement of said roller-carrying member relative to said trunnion member along the longitudinal axis of said cylindrical body until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

8. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member having a screw element which includes a cylindrical body from both ends of which extends a stub shaft, the longitudinal axis of said cylindrical body being substantially normal to the axis of rotation of said discs and spaced outwardly therefrom; means formed on said frame journalling said stub shafts; a roller-carrying member having a nut element encompassing said screw element, said nut element being formed with a radially extending shaft normal to the longitudinal axis of said cylindrical body for supporting said roller, the axis of rotation of said roller normally intersecting the axis of rotation of said disc members; a gear keyed to one of said stub shafts; complementary grooves formed on the confronting surfaces of said screw and nut elements and defining a screw thread; a ball-return tube interconnecting the outermost grooves in said nut element; ball elements disposed within said grooves; and a control ring rotatably journaled by said frame and engaging said gear whereby rotation of said control ring will effect concurrent movement of said roller-carrying member relative to said trunnion member along the longitudinal axis of said cylindrical body until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

9. A conical roller transmission, comprising: a frame; a pair of relatively axially shiftable, independently rotatable, coaxial driving and driven discs formed with spaced-apart opposed concave surfaces of revolution approximating a toric section; a conically profiled roller interposed between said discs and formed with a convex surface bridging the concave surfaces thereof; a trunnion member having a screw element which includes a cylindrical body from both ends of which extends a stub shaft, the longitudinal axis of said cylindrical body being substantially normal to the axis of rotation of said discs and spaced outwardly therefrom; means formed on said frame journalling said stub shafts; a roller-carrying member having a nut element encompassing said screw element, the radially inner portion of said nut element being formed with a slideway; a radially extending shaft supporting said roller with the axis of rotation of said roller normally intersecting the axis of rotation of said disc members, the radially outer portion of said shaft being formed with a boss that is slidably disposed within said slideway in order that said roller may follow relative axial shifting of said discs; a gear keyed to one of said stub shafts; complementary grooves formed on the confronting surfaces of said screw and nut elements and defining a screw thread; a ball-return tube interconnecting the outermost grooves in said nut element; ball elements disposed within said grooves; and a control ring rotatably journaled by said frame and engaging said gear whereby rotation of said control ring will effect concurrent movement of said roller-carrying member relative to said trunnion member along the longitudinal axis of said cylindrical body until the axis of rotation of said roller no longer intersects the axis of rotation of said discs in preparation for a change to a new ratio position wherein said axes will again intersect, said roller automatically moving bodily to said new ratio position with its surface in contact with the surfaces of said discs undergoing substantially skid-free rolling movement in a spiral path along the latter surfaces as said discs are rotated.

References Cited in the file of this patent

UNITED STATES PATENTS

| | | |
|---|---|---|
| 1,698,229 | Hayes | Jan. 8, 1929 |
| 2,734,389 | Strecker | Feb. 14, 1956 |
| 2,748,614 | Weisel | June 5, 1956 |

FOREIGN PATENTS

| | | |
|---|---|---|
| 997,509 | France | Sept. 12, 1951 |